(12) United States Patent
Commaret et al.

(10) Patent No.: US 7,891,190 B2
(45) Date of Patent: Feb. 22, 2011

(54) COMBUSTION CHAMBER OF A TURBOMACHINE

(75) Inventors: Patrice Andre Commaret, Rubelles (FR); Denis Jean Maurice Sandelis, Nangis (FR)

(73) Assignee: Snecma, Paris (FR)

( * ) Notice: Subject to any disclaimer, the term of this patent is extended or adjusted under 35 U.S.C. 154(b) by 903 days.

(21) Appl. No.: 11/745,161

(22) Filed: May 7, 2007

(65) Prior Publication Data

US 2007/0269757 A1 Nov. 22, 2007

(30) Foreign Application Priority Data

May 19, 2006 (FR) .................................. 06 04486

(51) Int. Cl.
*F02C 1/00* (2006.01)
(52) U.S. Cl. .......................................... 60/737; 60/748
(58) Field of Classification Search .................. 60/737, 60/740, 748, 752, 755–756, 796
See application file for complete search history.

(56) References Cited

U.S. PATENT DOCUMENTS

| 1,522,520 | A | * | 1/1925 | Illmer | 123/275 |
| 1,620,754 | A | | 3/1927 | Boyd et al. | |
| 3,493,180 | A | * | 2/1970 | Walsh | 239/406 |
| 3,574,508 | A | * | 4/1971 | Rothhaar et al. | 431/351 |
| 3,834,159 | A | * | 9/1974 | Vdoviak | 60/746 |
| 4,313,721 | A | | 2/1982 | Henriques | |
| 4,696,157 | A | * | 9/1987 | Barbier et al. | 60/39.23 |
| 5,941,076 | A | * | 8/1999 | Sandelis | 60/752 |
| 2007/0125093 | A1 | * | 6/2007 | Burd et al. | 60/804 |

FOREIGN PATENT DOCUMENTS

| DE | 1 215 443 | | 4/1966 |
| EP | 0 153 842 | A1 | 9/1985 |
| EP | 0 182 687 | A1 | 5/1986 |
| EP | 0 833 107 | A1 | 4/1998 |
| FR | 2 673 454 | A1 | 9/1992 |
| GB | 802545 | | 10/1958 |

OTHER PUBLICATIONS

U.S. Appl. No. 12/190,105, Aug. 12, 2008, Commaret, et al.

* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, L.L.P.

(57) ABSTRACT

A combustion chamber of a turbomachine is disclosed. The combustion chamber includes at least one bowl with a substantially frustoconical wall that is formed with an annular row of air injection orifices and a fuel injector arranged upstream of the bowl. The annular row of air injection orifices includes smaller-diameter orifices and larger-diameter orifices which are arranged in alternating fashion and with a uniform distribution around the axis of the bowl to produce two annular air/fuel mixture layers.

11 Claims, 3 Drawing Sheets

COMBUSTION CHAMBER OF A TURBOMACHINE

BACKGROUND OF THE INVENTION AND DESCRIPTION OF THE PRIOR ART

The present invention relates to a combustion chamber of a turbomachine, such as an aircraft turbojet or turboprop.

Combustion chambers of turbomachines must be designed to limit the production of harmful gases, such as nitrogen oxides ($NO_x$) and carbon dioxide ($CO_2$) which are discharged into the atmosphere.

In a conventional manner, a turbomachine combustion chamber has an annular shape and comprises a plurality of mixer bowls which are mounted on the chamber endwall and uniformly distributed around the longitudinal axis of the chamber. Each bowl is mounted downstream of a fuel injector, in the axis of this injector, and comprises a substantially frustoconical wall formed with an annular row of air injection orifices to produce an annular layer of an air/fuel mixture intended to be ignited in the primary zone of the chamber.

The distribution and the dimensions of the air injection orifices of the bowls are theoretically determined to ensure that the annular layer has a shape and opening angle optimally tailored to the various operating modes of the turbomachine.

To meet these requirements, a combustion chamber has been proposed (EP-A1-0 598 662) with two coaxial annular rows of mixer bowls comprising air injection orifices distributed in annular rows in each bowl, one of the rows of bowls forming an idle head, and the other of these rows of bowls forming a takeoff head.

This solution has the drawback of being cumbersome and requiring a large number of injectors and bowls.

SUMMARY OF THE INVENTION

The subject of the present invention is a combustion chamber which does not have these drawbacks and which, in particular, comprises a small number of injectors and provides an optimum compromise between idle operation and full-throttle operation.

Accordingly, the invention provides a combustion chamber of a turbomachine, comprising at least one bowl with a substantially frustoconical wall that is formed with an annular row of air injection orifices which are uniformly distributed around the axis of the bowl, and a fuel injector arranged upstream of the bowl and in the axis thereof to produce an annular layer of an air/fuel mixture injected downstream of the bowl, wherein the annular row of air injection orifices comprises smaller-diameter orifices and larger-diameter orifices which are arranged in alternating fashion and with a uniform distribution around the axis of the bowl to produce two annular air/fuel mixture layers which are coaxial and have different opening angles.

In the combustion chamber according to the invention, the layer produced by the smaller-diameter orifices of the bowl has a relatively large opening angle which is optimized for idle mode and for those modes of the turbomachine requiring a relatively long residence time for the air/fuel mixture in the primary zone of the chamber, and the layer produced by the larger-diameter orifices has a relatively small opening angle which is optimized for full-throttle operation of the turbomachine.

The invention therefore makes it possible to form two fuel layers with different opening angles in the bowl using a single annular row of air injection orifices. These layers overlap from one bowl to the other, and the larger opening of the layers which are generated by the smaller-diameter orifices makes it possible to increase the circumferential pitch between the bowls and thus reduce the number of injectors of the chamber, the combustion being propagated as a result of the overlapping between the fuel layers having a larger opening. The combustion chamber can thus advantageously comprise from 16 to 26 bowls and injectors.

The uniform distribution of the smaller-diameter orifices and the larger-diameter orifices around the axis of the bowl makes it possible to form coaxial and axisymmetric layers which bring about a homogeneous distribution of the air/fuel mixture in the chamber and which prevent the creation of temperature gradients in the chamber.

According to another feature of the invention, the row of air injection orifices in the bowl comprises, for example, between 20 and 30 orifices.

The opening angles of the fuel layers are determined so as to optimize the performance of the turbomachine in the various operating modes and to limit the production of harmful gases such as nitrogen oxides.

Preferably, the air/fuel layer produced by the smaller-diameter orifices has a substantially frustoconical shape and an opening angle between 60 and 80° approximately, and the air/fuel layer produced by the larger-diameter orifices has a substantially frustoconical shape and an opening angle of between 30 and 50° approximately.

The smaller-diameter air injection orifices and/or the larger-diameter orifices can have diameters which are slightly different from one another and which vary around a mean value. By way of example, the smaller-diameter orifices have a mean diameter between 0.5 and 1.5 mm approximately, and the larger-diameter orifices have a mean diameter between 1.5 and 2.5 mm approximately.

Preferably, the ratio of the axial length to the radial dimension of the chamber is between 2 and 3 approximately.

The invention also relates to a turbomachine, such as an aircraft turbojet or turboprop, comprising a combustion chamber as described above.

The invention additionally relates to a mixer bowl for a combustion chamber of a turbomachine, which comprises an annular row of larger-diameter orifices and smaller-diameter orifices arranged in alternating fashion and with a uniform distribution around the axis of the bowl.

The smaller-diameter orifices have a mean diameter between 0.5 and 1.5 mm approximately, the larger-diameter orifices have a mean diameter between 1.5 and 2.5 mm approximately, and the bowl comprises 20 to 30 air injection orifices.

BRIEF DESCRIPTION OF THE DRAWINGS

The invention will be better understood and other features, details and advantages thereof will become more clearly apparent on reading the description below given by way of nonlimiting example and with reference to the appended drawings, in which.

DESCRIPTION OF THE PREFERRED EMBODIMENTS

Figure 1:
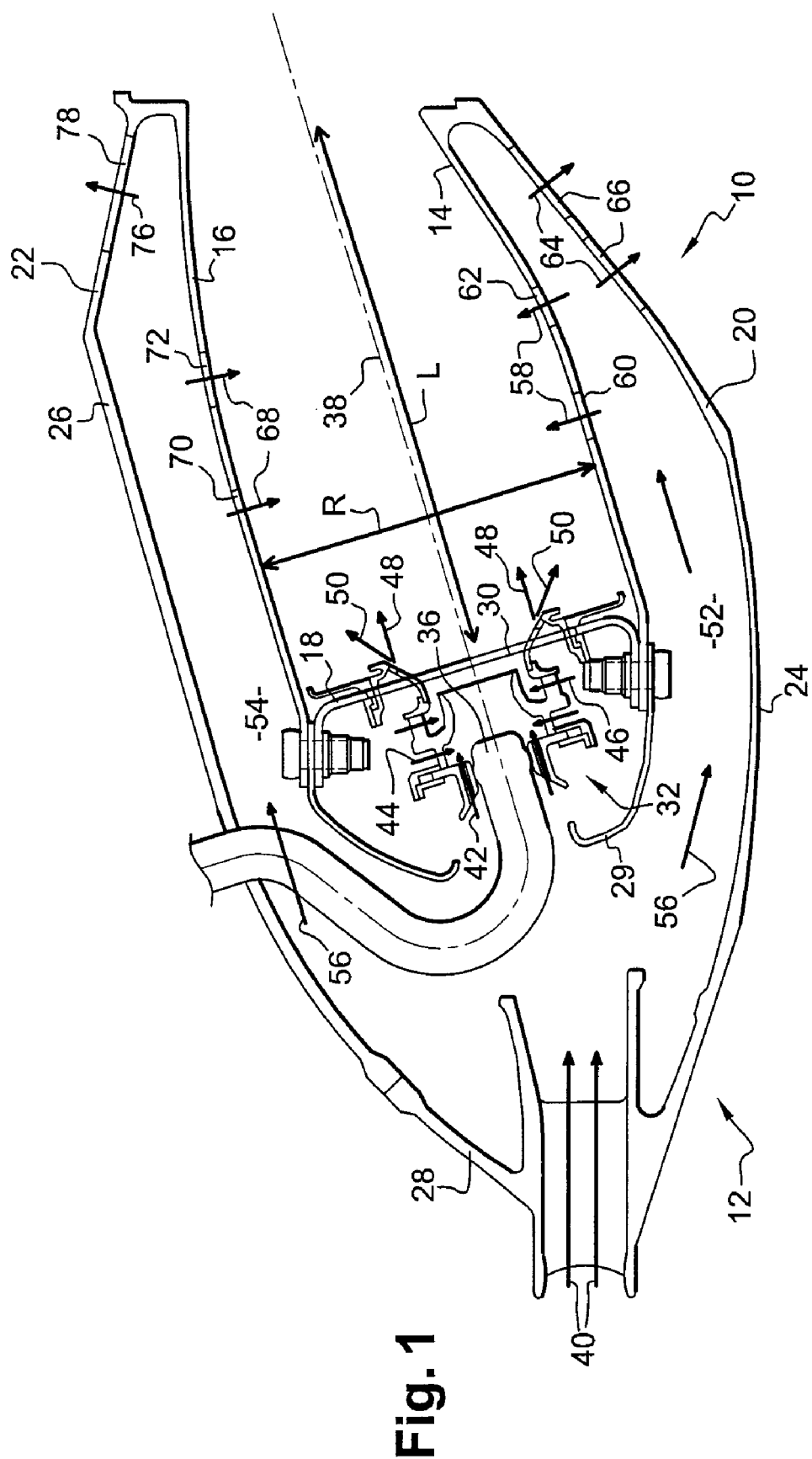
FIG. 1 is a schematic half-view in axial section of a diffuser and of a combustion chamber according to the invention of a turbomachine.

FIG. 1 represents an annular combustion chamber 10 of a turbomachine such as an aircraft turbojet, this chamber being arranged at the outlet of a diffuser 12, itself situated at the outlet of a compressor (not shown), and comprising an axisymmetric internal wall 14 and an axisymmetric external wall 16 which are connected upstream to a chamber annular endwall 18 and fastened downstream by internal 20 and external 22 frustoconical shells respectively to an internal frustoconical case 24 of the diffuser and to an external casing 26 of the chamber, the upstream end of this casing being connected to an external frustoconical case 28 of the diffuser.

An annular cowl 29 is fastened to the upstream ends of the walls 14, 16 and 18 of the chamber and comprises air flow orifices aligned with openings 30 in the chamber endwall 18, in which openings are mounted systems 32 for injecting an air/fuel mixture into the chamber, the air from the diffuser 12 and the fuel being supplied by injectors (not shown) which are fastened to the external casing 26 and uniformly distributed around the axis of the chamber. Each injector comprises a fuel injection head 36 aligned with the axis 38 of the corresponding opening 30.

The ratio of the axial length L to the radial dimension R of the chamber with respect to this axis 38 is between 2 and 3 approximately so as to meet the requirements of the various operating modes of the turbomachine in terms of the residence time of the air/fuel mixture in the chamber and so as to limit the emission of harmful gases such as nitrogen oxides ($NO_x$). The residence time of the air/fuel mixture in the chamber is between 5 and 10 ms approximately.

One portion of the air flow 40 delivered by the compressor and leaving the diffuser 12 passes into the system 32, as will be described in more detail below, and is mixed with the injector-supplied fuel and injected into the combustion chamber (arrows 42, 44, 46, 48, 50), the other portion of the air flow supplying internal 52 and external 54 annular ducts for bypassing the combustion chamber 10 (arrows 56).

The internal duct 52 is formed between the internal case 24 of the diffuser 12 and the internal wall 14 of the chamber, and the air which passes into this duct is divided into a flow 58, which enters the chamber 10 via orifices 60, 62 in the internal wall 14, and into a flow 64 which passes through holes 66 in the internal shell 20 of the chamber so as to cool components (not shown) situated downstream of this chamber.

The external duct 54 is formed between the external casing 56 and the external wall 16 of the chamber, and the air which passes into this duct is split into a flow 68, which enters the chamber 10 via orifices 70, 72 in the external wall 16, and into a flow 76 which passes through the holes 78 in the external shell 22 so as to cool components downstream.

The orifices 60, 70 are termed primary-air inlet orifices since they supply the so-called primary zone of the combustion chamber situated in the upstream part of the chamber where the combustion reactions of the air/fuel mixture take place, and the orifices 62, 72 are termed dilution/air inlet orifices since they supply the so-called dilution zone of the combustion chamber situated in the downstream part of the chamber and in which the combustion gases are diluted.

The combustion of the air/fuel mixture is initiated in the primary zone of the chamber by means of one (or two) igniter plug or plugs (not shown).

Figure 2:
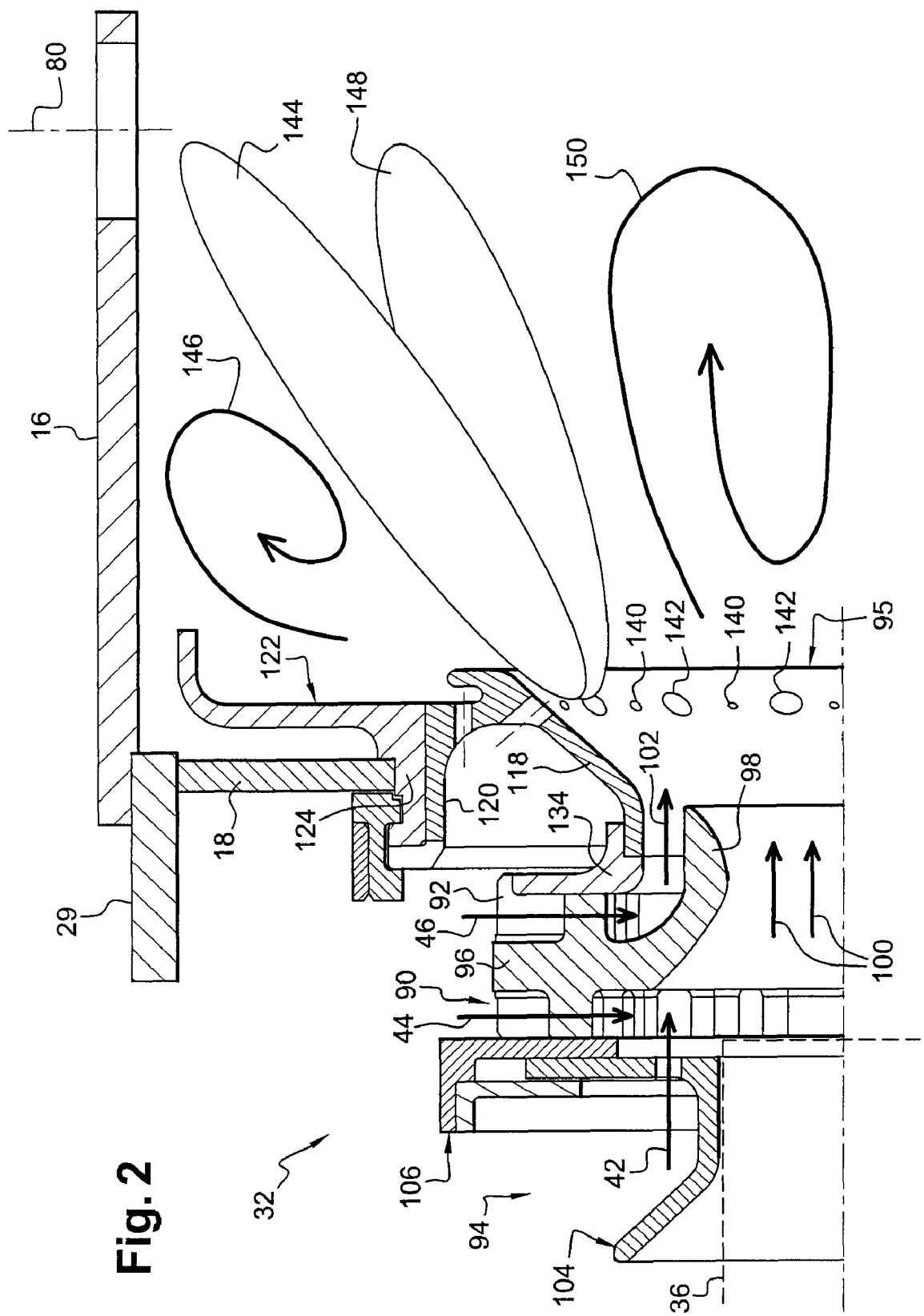
FIG. 2 is an enlarged partial view of FIG. 1 and represents an air/fuel mixture injection system of the chamber.

The injection system 32, which can be seen most clearly in FIG. 2, comprises two coaxial turbulence-inducing swirlers, an upstream one 90 and a downstream one 92, which are connected upstream to means 94 for centering and guiding the head 36 of the injector, and downstream to a mixer bowl 95 which is mounted axially in the opening 30 in the chamber endwall 18.

The swirlers 90, 92 each comprise a plurality of vanes radially extending around the axis of the swirler and uniformly distributed around this axis so as to deliver a swirling air stream 44, 46 downstream of the injection head 36.

The swirlers 90, 92 are separated from one another by a radial wall 96 connected at its radially internal end to a venturi 98 which extends axially in the downstream direction inside the downstream swirler 92 and which separates the air flows emanating from the upstream 90 and downstream 92 swirlers. A first annular air flow path 100 is formed inside the venturi and a second annular air flow path 102 is formed outside the venturi. The air flowing in these paths 100, 102 is intended to be mixed with the fuel supplied by the injector so as to form an atomized fuel cone around the axis of the injector.

In the example represented, the venturi 98 and the vanes of the swirlers 90, 92 are formed in a single piece with the radial wall 96.

The means 94 for guiding the injection head 36 of the injector comprise a ring 104 traversed axially by the injection head 36 and mounted so that it can slide radially in a sleeve 106 which, together with the wall 96, axially defines the annular flow path for the air stream 42 in the upstream swirler 90.

The mixer bowl 95 has a substantially frustoconical wall 118 flared out downstream and connected at its downstream end to a cylindrical rim 120 which is mounted axially in the opening 30 in the chamber endwall 18 with an annular deflector 122. The upstream end of the frustoconical wall 118 of the bowl is fastened to an intermediate annular part 134 which, together with the radial wall 96, axially defines the annular flow path for the air stream 44 in the downstream swirler 92.

The frustoconical wall 118 of the bowl comprises an annular row of air injection orifices which is formed by an alternating arrangement of smaller-diameter orifices 140 and larger-diameter orifices 142.

The smaller-diameter orifices 140 are uniformly distributed around the axis of the bowl 95, and the air flow 50 leaving these orifices is mixed with the fuel cone leaving the venturi 98 to form an air/fuel mixture layer 144 with a large opening angle, this opening angle being optimized for idle mode and to provide good initiation and good propagation of the combustion in the combustion chamber.

The fuel layer produced by the orifices 140 makes it possible to create a combustion gas recirculation zone 146 in the chamber, situated radially outside the layer 144, which increases the gas residence time in the primary zone of the chamber and limits the production of harmful gases.

An igniter plug 80 is situated in the primary zone of the chamber, in the vicinity of the downstream end of the layer 144 having a large opening angle, and makes it possible to initiate the combustion of this layer, which in turn leads to the combustion of the layers 144 having a large opening angle which are produced by the adjacent bowls.

The orifices 140 can have diameters which vary slightly with respect to a mean diameter between 0.5 and 1.5 mm approximately, and the layer 144 produced by these orifices has, for example, an opening angle of between 60 and 80° approximately.

The larger-diameter orifices 142 are uniformly distributed around the axis of the bowl over the same circumference of the smaller-diameter orifices 140 such that two larger-diameter orifices 142 are separated by one smaller-diameter orifice 140.

The air flow 48 leaving the orifices 142 is mixed with the fuel cone from the venturi 98 to form a fuel layer 148 whose opening angle is relatively small and optimized for full-throttle operation of the turbomachine.

The formation of the layer 148 generates a combustion gas recirculation zone 150 inside the layer which reduces the residence time of these gases in the primary zone of the chamber and also makes it possible to limit the emission of harmful gases. The combustion of the layer 148 from a bowl is caused by the combustion of the layer 144 from this same bowl.

The orifices 142 can also have diameters which vary slightly around a mean diameter between 1.5 and 2.5 mm approximately, and the layer produced by these orifices has, for example, an opening angle between 30 and 50° approximately.

Figure 3:
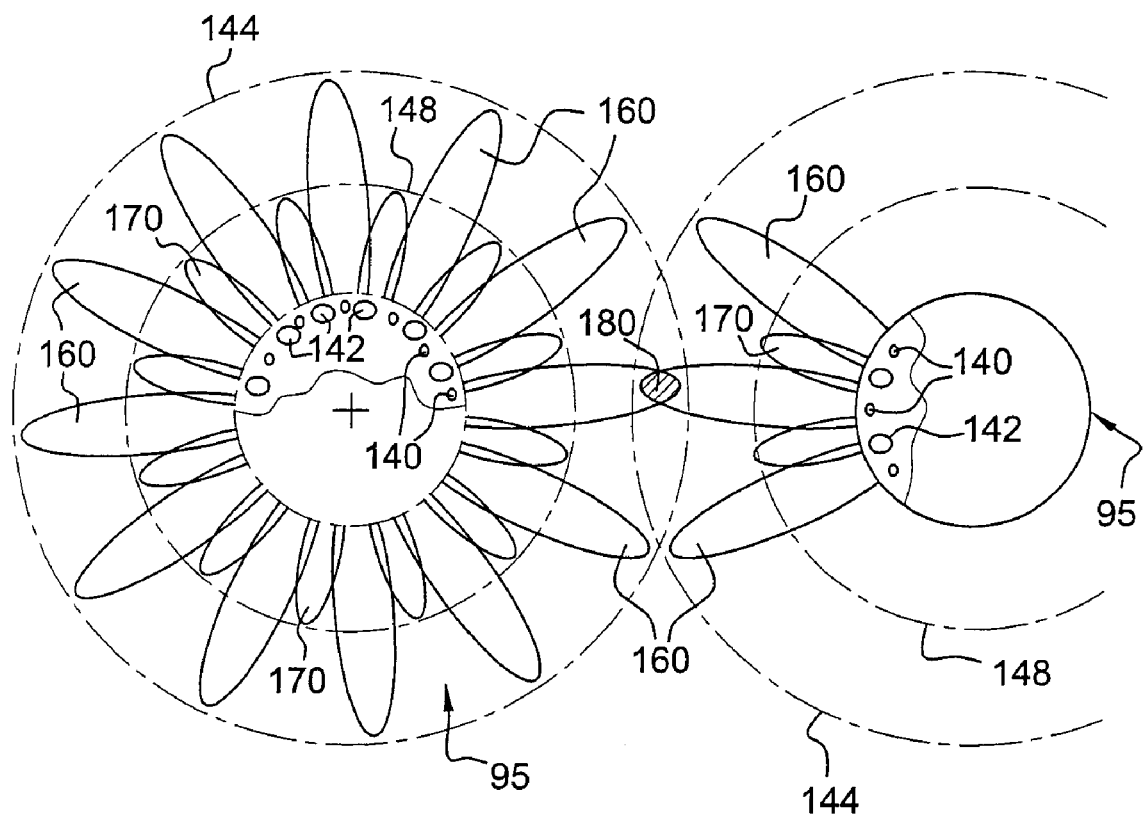
FIG. 3 illustrates very schematically the operation of a bowl according to the invention.

FIG. 3 represents very schematically the spatial distribution of the air/fuel mixture in layer form around an injection bowl 95.

The air/fuel mixture 170 produced by a larger-diameter orifice 142 has a small diffusion angle and is diffused to a small radial distance with respect to the axis of the bowl. All the orifices 142 in a bowl 95 make it possible to form an annular air/fuel mixture layer 148 having a relatively small opening angle.

The air/fuel mixture 160 produced by a smaller-diameter orifice 140 has a large diffusion angle and is diffused to a large radial distance with respect to the axis of the bowl. All the orifices 140 in a bowl 95 make it possible to produce an annular air/fuel mixture layer 144 having a relatively large opening angle. The propagation of the combustion in the chamber is brought about by the overlapping between downstream end portions (hatched zones 180) of the layers 144 having a large opening angle which are produced by the injection bowls.

The air/fuel layers 144, 148 can be controlled by acting on the ratio of the air flow 102 leaving the downstream swirler 92 to the air flow 48, 50 leaving the orifices 140, 142 in the bowl. This ratio is preferably between 0.5 and 2 approximately.

The combustion chamber according to the invention comprises, for example, from 16 to 26 injection systems and an equal number of mixer bowls uniformly distributed around the axis of the chamber.

The invention claimed is:

1. A combustion chamber of a turbomachine, comprising:
   at least one bowl with a substantially frustoconical wall flared in a downstream direction and provided with an annular row of air injection orifices which are uniformly distributed around an axis of the bowl, and a cylindrical rim connected at a downstream end of the frustoconical wall that is mounted axially in an opening of a chamber endwall with an annular deflector downstream from the endwall; and
   a fuel injector arranged upstream of the bowl and in the axis thereof which produces an annular layer of an air/fuel mixture injected downstream of the bowl,
   wherein the annular row of air injection orifices comprises smaller-diameter orifices and larger-diameter orifices which are arranged in alternating fashion and with a uniform distribution around the axis of the bowl to produce two annular air/fuel mixture layers which are coaxial and have different opening angles.

2. The chamber as claimed in claim 1, wherein two larger-diameter orifices are separated by one smaller-diameter orifice.

3. The chamber as claimed in claim 1, wherein the air/fuel layer produced by the smaller-diameter orifices has a substantially frustoconical shape and an opening angle between 60 and 80° approximately.

4. The chamber as claimed in claim 1, wherein the air/fuel layer produced by the larger-diameter orifices has a substantially frustoconical shape and an opening angle between 30 and 50° approximately.

5. The chamber as claimed in claim 1, wherein at least one of the smaller-diameter air injection orifices or the larger-diameter orifices have diameters which are slightly different from one another.

6. The chamber as claimed in claim 1, wherein the smaller-diameter orifices have a mean diameter between 0.5 and 1.5 mm approximately, and the larger-diameter orifices have a mean diameter between 1.5 and 2.5 mm approximately.

7. The chamber as claimed in claim 1, wherein the row of orifices comprises between 20 and 30 air injection orifices.

8. The chamber as claimed in claim 1, comprising 16 to 26 bowls and injectors.

9. The chamber as claimed in claim 1, wherein a ratio of an axial length of the chamber to a radial dimension of the chamber is between 2 and 3.

10. A turbomachine comprising a combustion chamber as claimed in claim 1.

11. The chamber as claimed in claim 1, wherein an upstream end of the frustoconical wall is fastened to an intermediate annular part and the frustoconical wall, the intermediate annular part and a radial wall define an annular flow path for an air stream of a downstream swirler.

\* \* \* \* \*